May 9, 1939.  J. M. KIDD  2,157,668

FILTER FOR CREAM AND MILK

Filed Feb. 3, 1937

INVENTOR
James M. Kidd
BY
[signature]
ATTORNEYS

Patented May 9, 1939

2,157,668

UNITED STATES PATENT OFFICE 2,157,668

FILTER FOR CREAM AND MILK

James M. Kidd, Birmingham, Ala.

Application February 3, 1937, Serial No. 123,768

5 Claims. (Cl. 210—149)

My invention relates to a filter more particularly adapted for the filtering of milk, cream and the like wherein it is essential that the filters be readily disassembled so that they can be maintained sanitary and yet shall be capable of ready assemblage and to function with great efficiency for the removal of all foreign matter from the liquid food product.

The filtering of milk and cream calls for different treatment at different seasons of the year due to difference in characteristics or water content of the milk products and for this reason the filter must be readily convertible to existing operating conditions. To this end my invention contemplates the use of a multiple-disk filter so designed and arranged that the exact number of filterings and the filtering disk area employed is capable of ready variation.

The customary practice is to pump all cream or milk through the filter into a storage or treatment vat, and one distinctive feature of my invention is to take advantage of both the pressure on, and the hydrostatic head of, the liquid in the filter as the only means required for effectively holding the readily demountable filtering disk or disks sealed against their respective packing seats, and to this end my invention contemplates introducing the milk products under pressure into the top of the filtering chamber, having stepped reductions in cross section, adapted to filter the liquid in the desired number of stages by forcing it through filtering disks of successively decreasing cross sectional area, which disks, being free of any fixed attachment to the filter casing and held down only by the fluid pressure thereon, are freely removable and replaceable to facilitate the cleansing of the filter parts.

My invention further contemplates the provision of air relief valves arranged to form vents for breaking the suction under the several filtering disks so as to facilitate their removal, and to permit the escape of air trapped above each disk so as to permit the liquid to freely enter and fill the space above the disks successively.

My invention is further designed to be highly sanitary in that the packing ring seats for the filtering disks are all conveniently exposed for inspection and cleaning and each seat has an annular groove in which a packing ring is permanently and tightly seated so as to receive and support the marginal band of the filter disk clear of the ring seat.

My invention further contemplates forming each disk with a rigid perforated bottom plate having superposed thereon a woven wire filter layer of fine mesh held assembled on the perforated plate by annular clamp bands applied above and below the assembled filter elements and so connected as to provide a flat marginal seat to rest on its respective seat packing.

My invention further comprises the novel details of construction and arrangements of parts which, in their preferred embodiments only, are hereinafter more particularly described and claimed, reference being had to the accompanying drawing, in which:

Similar reference numerals refer to similar parts throughout the drawing.

Figure 1:
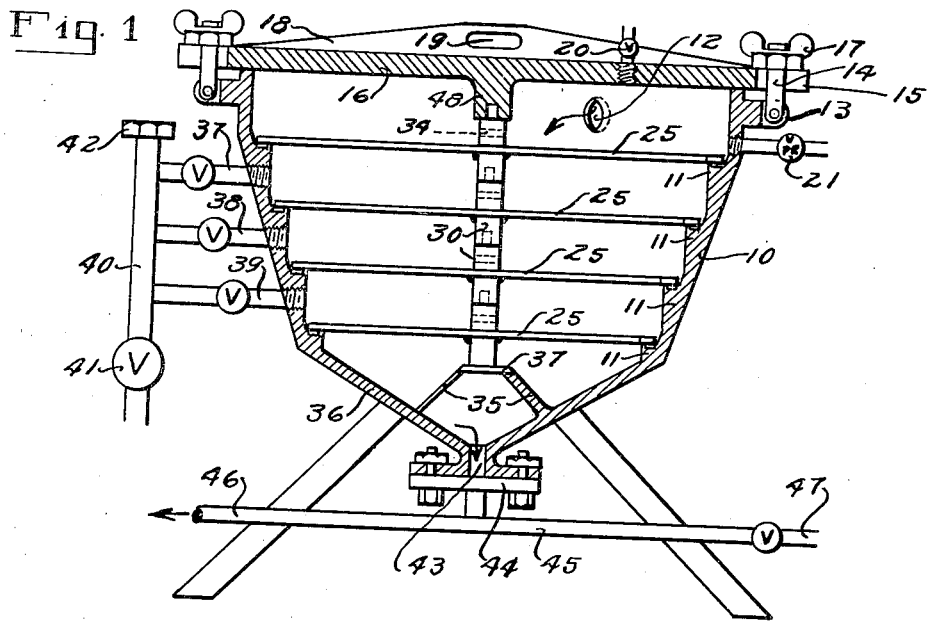
Fig. 1 is a vertical cross section through a filter casing embodying my invention and showing the filtering elements and piping system in elevation.
Figure 2:
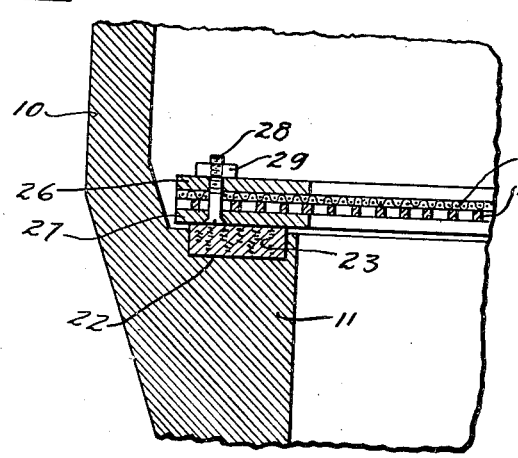
Fig. 2 is an enlarged detail cross section of a portion of one of the filtering disks shown resting upon its seat packing.
Figure 3:
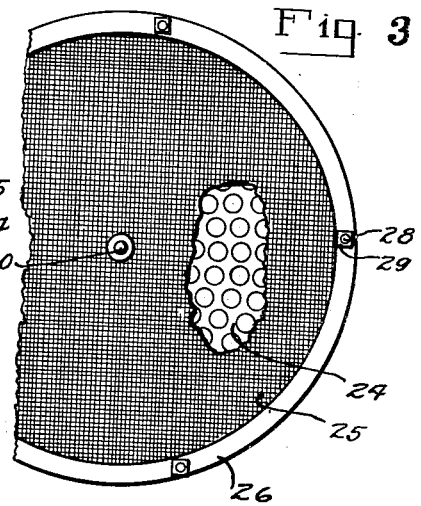
Fig. 3 is a fragmental plan view of one of the filter disks with its fine mesh overlying screen layer broken away to show its perforated supporting plate.
Figure 4:
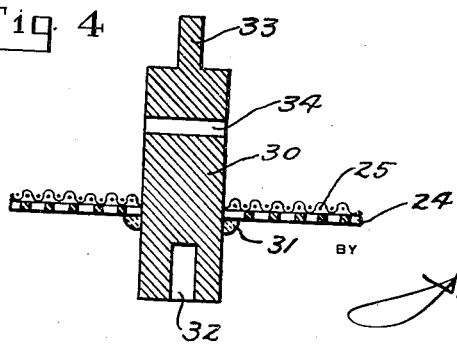
Fig. 4 is an enlarged vertical cross sectional detail view through one of the center studs for bracing and centering the successive disks and for the provision of tool grips to facilitate their removal and replacement.

In the embodiment of my invention illustrated, a filter casing 10 is shown of any suitable material and of any desired shape, the casing preferably having a downwardly tapering construction formed interiorally with annular stepped seat ledges 11 of successively decreasing diameter downwardly. The milk or cream to be filtered is introduced usually under pressure in the top of the filter casing through the inlet port 12. The casing has marginal lugs 13 to which threaded bolts 14 are pivoted and adapted to be received in marginal notches 15 formed in a cover 16 for the filter. Wing nuts 17 are applied to these bolts to clamp the cover securely in position to resist internal pressures. The cover 16 is shown formed with a transverse bracing web 18 preferably provided with a hand hole 19 for the convenient handling of the cover. I provide an air relief valve 20 on the cover and above the top seat 11 I mount a suitable automatic pressure relief valve 21.

The casing is shown provided with four annular filter disk seats 11, all similar except for a difference in diameter, and in the top face of each seat I form an annular groove 22 in which I mount fixedly an annular packing seat 23, the upper surface of which rises substantially above its respective shoulder level so that it alone serves to support the filter disk designed to rest thereon.

The filter disks differ only in size and each is composed of a stiff perforated metal plate 24 having a fine-mesh wire cloth screen 25 fitted over it and permanently connected thereto by means of the two clamp rings 26 and 27 connected through the disk elements by bolts 28 with countersunk heads seated flush in the under clamp ring 27. Nuts 29 engage the bolts and clamp the disk elements together.

Through the center of each filter disk I pass a vertical centering stud 30 which is preferably connected by the weld 31 to the plate 24 and which has in its under end a vertical centering socket 32 and at its upper end a complemental centering post 33. Each stud is provided with a transverse hole 34 adapted to receive a lifting tool by means of which the filter disk can be lifted in and out of the filter.

The filter is provided with spaced legs 35 rising from its cone bottom 36 and supporting a plate 37 upon which the stud 30 of the lowermost filter disk, when seated, is adapted to rest.

For the filter chamber lying immediately above each filter disk I provide a separate valve controlled air vent 37, 38 or 39, all discharging into a common pipe 40 having a control valve 41 and a top clean-out plug 42.

In the bottom of the filter I provide an outlet port 43 for the filtrate surrounded by a flange bolted to flange 44 to connect the outlet and drain piping system 45 to the filter comprising a filtrate outlet 46 and a valve controlled clean-out or drain outlet 47. The cover 16 has a depending center boss 48 provided with a socket similar to 32 to receive the post 33 and engage the upper filter disk stud 30. The several disk studs are similarly engaged but it is to be understood that pressure from the clamped down cover is not relied upon to seat the filter disks pressure tight, this effect being obtained by the application of other principles in a novel way.

Bearing in mind that it is a characteristic of milk products to immediately spread as a film over the fine mesh filtering-screens 25 of the disks and practically seal same, it is important that the filter should be of the down flow pressure type so that the filter disks can respond to this natural condition and be held seated leaktight against their respective seat packings 23 by fluid pressure.

In operation, the several relief pet cocks 37, 38 and 39 are closed and the top vent 20 and the lower pet cock 39 are opened before commencing to pump the milk products into the filter. The liquid first enters the top filter chamber and spreads itself like a film over the upper screen filtering surface thereof and commences to seep through this filter disk and through the lower filter disks and to make its way out through the bottom discharge 43. The inflow, due to pressure feed, is greater than the outflow and the liquid level commences to rise from the bottom in the filter. When it reaches the level of the pet cock 39 this is closed and pet cock 38 is opened, and when the liquid rises to the level of the latter it in turn is closed and pet cock 37 is opened. When the liquid rises above the pet cock 37 the air trapped above it is released directly through the vent 20 until the liquid makes its appearance at this outlet and thereupon vent 20 is closed. The filter is then completely filled with the milk products under a pump pressure of say six to eight pounds and this filling operation is accomplished by the manipulation of the air vents above described so as to avoid the existence of an air lock in such operation. Until the filter is thus filled the screens are subjected to a pressure exerted by the weight of the heavy liquid thereon and the resistance offered by the fine mesh filtering screen 25 of each disk. Such unit pressure multiplied over the relatively large surface area of the disks has proven ample to hold them seated leak-tight on their respective packing seats 23 so as to prevent the bypassing of any of the milk products.

When the filter becomes filled the pressure of the pump is thereupon established on the liquid at the top of the filter and this pressure is distributed with a drop through each filtering stage. In practice, I have successfully operated these filters with an initial pump pressure of around eight pounds in the top stage which drops to around two pounds in the lowermost stage. This pressure added to the hydrostatic head forces the disks very firmly to their seats and insures the filter against leakage. Moreover, as foreign matter collects on the filter disks they become more impervious and the resistance offered increases so that the firmness of their seating is proportionately increased. All of this is accomplished without any connecting bolts or attachment for the screens that would increase the cost of the equipment, slow up the procedure of removing or replacing the disk, and increase the difficulty of maintaining the filter in the highly sanitary condition required for treating milk products.

The provision of the pet cocks 37, 38 and 39 is of importance in that they can be opened to break the vacuum under the several disks when it is desired to remove them for cleaning purposes, it being obvious with a thick almost impervious film on each disk there will be very strong suction pull to resist lifting it from its packing seat unless this is relieved by opening the appropriate pet cock.

The center studs 30 are provided to center the disks, to provide tool grips for their removal and insertion, and to form loose hold-down means and center supporting means for the disks, it being obvious that where all of the screens are employed the bottom support 37 will resist any tendency of the screens to give down under load or pressure at their center.

It is to be understood that the apparatus will function with proportionate efficiency as a filter, whether one, two, three or four filter disks are used and when one is used any one of the disks may be selected to perform the filtering action. When the milk product requires less filtration excellent results can be obtained with the use of only the top disk but as the occasion for closer filtration arises more and more disks can be added, thus keeping the whole operation flexible and very simple.

To clean out the filter, the thumb nuts are run up, bolts 14 thrown out, cover 16 is lifted off and by any suitable tool the filter disks are lifted out one by one by engaging a suitable hook in their respective stud hole 34 and if suction under the filter disk renders its removal difficult this can be overcome by opening the relief port immediately below the disk to be removed.

For the purposes of economical manufacture the adaptation of each disk to seat itself only against an elastic or yielding seat packing is desirable, as it eliminates the fine machine work and ground fit that would be required for the disks to engage with the requisite tightness against a metallic seat but obviously if desired a metal to metal seat can be used.

By my invention I provide a comparatively inexpensive, flexible and highly efficient and sanitary filter, peculiarly suited to the needs of dairy and butter fat industries, and while I have shown the same only in its preferred form, it will be obvious to those skilled in the art that it is not so limited, but is susceptible of various changes and modifications in shape, size and selection of materials, without departing from the spirit thereof, and I desire, therefore, that only such limitations shall be placed thereupon as are imposed by the prior art or as are specifically set forth in the appended claims.

What I claim is:

1. In a pressure filter for the treatment of milk products and the like, a filtering chamber having a movable top cover and a plurality of stepped seats decreasing progressively in size downwardly for the accommodation of different sized filtering disks, a plurality of filtering disks adapted to be mounted on said seats free of any mechanical attachment thereto and each comprising a perforated rigid lower supporting element and a top fine mesh screen superimposed thereover and marginally secured in position thereon, means to pass the milk product to be filtered with a down flow through the filter disks under sufficient pressure and hydrostatic head to hold said disks in leak-tight engagement with their respective seats, and a valve controlled air and vacuum relief vent opening into the filter below each disk seat and operable to prevent the trapping of air in the filter and to break the vacuum under each disk to permit its ready removal from the filter.

2. A pressure filter according to claim 1, in which the air relief vents below a plurality of screens are mounted in the filter chamber wall and have a common discharge pipe.

3. In a pressure filter for the treatment of milk products and the like, a filtering chamber having a movable top cover and a plurality of stepped seats decreasing progressively in size downwardly for the accommodation of different sized filtering disks, a plurality of filtering disks adapted to be mounted on said seats free of any mechanical attachment thereto, and each comprising a perforated, rigid, lower supporting plate, a fine mesh screen element overlying said plate and marginally held assembled therewith, and an annular smooth face ring secured to the under peripheral edge of said plate to provide a smooth face for engagement with said seats, means to pass the milk products to be filtered with a down flow through the filter disks under sufficient pressure and hydrostatic head to hold said disks in leak-tight engagement with their respective seats, and means to prevent the trapping of air in the filter and to break the vacuum under the disks to permit of their ready removal from the filter.

4. A pressure filter for milk products and the like comprising a casing having a movable top cover, a top inlet, a bottom outlet, and a stepped series of filter disk seats decreasing downwardly in size, a raised packing extending continuously about and above each disk seat, and a series of separately removable filter disks adapted to the several seats and each comprising a stiff perforated under plate, a fine mesh screen overlying said plate, marginal clamp rings to connect the plate and screen and provide a smooth continuous marginal seat adapted to engage said packing, and a stud made fast at the center of each disk, said studs on the superposed disks standing in vertical alignment and in engagement.

5. A pressure filter for milk products and the like, comprising a casing having a movable top cover, a top inlet, a bottom outlet, and a stepped series of filter disk seats decreasing downwardly in size and having a raised packing anchored in the working face of each seat in position to support its respective filter disk with a leak-tight joint when such disk is working under pressure normally prevailing in the filter, and a series of loose, separately removable filter disks adapted to the several seats and comprising a rigid perforated plate, a filter element superimposed thereon, a marginal smooth face ring secured to the under periphery of each plate in position to engage the packing ring on its respective seat, and marginal means to hold the filter element in superimposed relationship on its respective plate.

JAMES M. KIDD.